US012807047B2

(12) United States Patent
Li et al.

(10) Patent No.: US 12,807,047 B2
(45) Date of Patent: Nov. 24, 2026

(54) CHILD SAFETY SEAT

(71) Applicant: Bambino Prezioso Switzerland AG, Steinhausen (CH)

(72) Inventors: Ruyi Li, Dongguan (CN); Zujian Liu, Dongguan (CN)

(73) Assignee: Bambino Prezioso Switzerland AG, Steinhausen (CH)

(*) Notice: Subject to any disclaimer, the term of this patent is extended or adjusted under 35 U.S.C. 154(b) by 225 days.

(21) Appl. No.: 18/571,600

(22) PCT Filed: Jun. 17, 2022

(86) PCT No.: PCT/EP2022/066573
§ 371 (c)(1),
(2) Date: Dec. 18, 2023

(87) PCT Pub. No.: WO2022/263637
PCT Pub. Date: Dec. 22, 2022

(65) Prior Publication Data
US 2024/0286535 A1 Aug. 29, 2024

(30) Foreign Application Priority Data
Jun. 18, 2021 (CN) ......................... 202110680756.5

(51) Int. Cl.
*B60N 2/28* (2006.01)
*B60N 2/812* (2018.01)

(52) U.S. Cl.
CPC ......... *B60N 2/2851* (2013.01); *B60N 2/2824* (2013.01); *B60N 2/2869* (2013.01); *B60N 2/812* (2018.02)

(58) Field of Classification Search
CPC .... B60N 2/2887; B60N 2/289; B60N 2/2893; B60N 2/2821; B60N 2/2824; B60N 2/2827; B60N 2/812; B60N 2/2851; B60N 2/2869
(Continued)

(56) References Cited

U.S. PATENT DOCUMENTS 7,452,031 B2 * 11/2008 Woellert .............. B60N 2/2851 297/484
7,954,895 B2 * 6/2011 Freeman .............. B60N 2/2851 297/410
(Continued)

FOREIGN PATENT DOCUMENTS

CN 202173100 U 3/2012
CN 104627037 A 5/2015
(Continued)

OTHER PUBLICATIONS

"First Office Action Issued in Corresponding Chinese Patent Application No. 202110680756.5" along with Partial English Translation, Mailed Date: Sep. 11, 2024, 7 pages.
(Continued)

*Primary Examiner* — Milton Nelson, Jr.
(74) *Attorney, Agent, or Firm* — Volpe Koenig

(57) ABSTRACT

A child safety seat includes: a base provided with a pivotable support leg; a seat having a backrest, the backrest being provided with a height-adjustable headrest; a headrest limiting device operably connected to the support leg and including a first locking member, when the support leg is in an unfolded state, the first locking member is in an extended state, so that the first locking member is capable of being engaged with the headrest, thereby limiting an upper adjustment height of the headrest, and when the support leg is in a folded state, the first locking member is in a retracted state; or a second locking member, when the support leg is in the
(Continued)

100 unfolded state, the second locking member is in a retracted, and when the support leg is in the folded state, the second locking member is in an extended state, so that the second locking member is capable of being engaged with the headrest, thereby limiting a lower adjustment height of the headrest.

16 Claims, 13 Drawing Sheets

(58) Field of Classification Search
USPC .......................................................... 297/253
See application file for complete search history.

(56) References Cited

U.S. PATENT DOCUMENTS

| | | | | |
|---|---|---|---|---|
| 8,622,476 | B2 * | 1/2014 | Karremans | B60N 2/2812 297/410 |
| 10,730,414 | B2 * | 8/2020 | Pleiman | B60N 2/286 |
| 11,413,992 | B2 * | 8/2022 | Zhang | B60N 2/2851 |
| 2012/0181829 | A1 | 7/2012 | Williams et al. | |
| 2012/0223558 | A1 | 9/2012 | Wang | |
| 2012/0319442 | A1 | 12/2012 | Clement | |
| 2019/0344694 | A1 | 11/2019 | Johnson et al. | |
| 2024/0286535 | A1 | 8/2024 | Li et al. | |

FOREIGN PATENT DOCUMENTS

| | | | | |
|---|---|---|---|---|
| CN | 105083071 | A | 11/2015 | |
| CN | 206067560 | U | 4/2017 | |
| CN | 107499198 | A | 12/2017 | |
| CN | 109050357 | A | 12/2018 | |
| CN | 109795382 | A | 5/2019 | |
| CN | 110723038 | A | 1/2020 | |
| CN | 111186347 | A | 5/2020 | |
| CN | 210554333 | U | 5/2020 | |
| CN | 111251955 | A | 6/2020 | |
| CN | 111845485 | A | 10/2020 | |
| CN | 215971213 | U | 3/2022 | |
| DE | 202016104181 | U1 | 9/2016 | |
| EP | 1810872 | B1 | 6/2010 | |
| GB | 2492201 | A | 12/2012 | |
| GB | 2555914 | A * | 5/2018 | B60N 2/2872 |
| JP | 2001097087 | A | 4/2001 | |
| JP | 2009502595 | A | 1/2009 | |
| JP | 7741208 | B2 | 9/2025 | |
| TW | 200730376 | A | 8/2007 | |
| TW | 1835171 | B | 3/2024 | |
| WO | 2017177511 | A1 | 10/2017 | |

OTHER PUBLICATIONS

Notice of Allowance issued in corresponding Taiwanese Application No. 111122660 dated Nov. 13, 2023. English Translation Included.
International Search Report and Written Opinion for PCT/EP2022/066573 dated Sep. 13, 2022.
"First Office Action Issued in Corresponding Taiwan Patent Application No. 113104983" along with partial English translation, Mailed Date: Feb. 4, 2025, 7 pages.
"First Office Action Issued in Corresponding Japanese Patent Application No. 2023-578685", along with partial English translation Mailed Date: Feb. 25, 2025, 4 pages.
European Patent Office. Search Report for corresponding application EP 25184321.5, mailed Sep. 12, 2025. 9 pages.
Australian Patent Office. First Office Action issued in corresponding application AU 2025238005, dated Sep. 24, 2026. 7 pages.
Japan Patent Office. First Office Action issued in corresponding application JP 2025-146834, dated Sep. 29, 2026. 8 pages.

* cited by examiner

CHILD SAFETY SEAT

CROSS REFERENCE TO RELATED APPLICATIONS

This application is a national stage of International Application PCT/EP2022/066573, filed on Jun. 17, 2022, which claims the priority benefit of Chinese Patent Application No. 202110680756.5, filed on Jun. 18, 2021. The contents of the above identified applications are hereby incorporated herein by reference in their entireties.

TECHNICAL FIELD

The present application relates to a child safety seat.

BACKGROUND

The child safety seat is used in vehicle to facilitate parents to travel with their children. Generally, the conventional child safety seat is usually provided with a headrest to support and protect the child's head, and the height of the headrest is adjustable to accommodate children of different heights. The height adjustment range of the headrest is generally relatively large to accommodate the needs of children as they grow to different heights. If the parent is not skilled in the use of child safety seat, it is easy to adjust the height of the headrest to an inappropriate height, so that the headrest cannot effectively protect the child's head. For example, for an infant passenger, the headrest is not suitable for being adjusted above a certain height, whereas for an older child passenger, the headrest is not suitable for being adjusted below a certain height.

SUMMARY

The present application provides a child safety seat including a base provided with a pivotable support leg; a seat having a backrest, the backrest being provided with a height-adjustable headrest; a headrest limiting device operably connected to the support leg and including a first locking member, when the support leg is in an unfolded state, the first locking member is in an extended state, so that the first locking member is capable of being engaged with the headrest, thereby limiting an upper adjustment height of the headrest, and when the support leg is in a folded state, the first locking member is in a retracted state; or a second locking member, when the support leg is in the unfolded state, the second locking member is in a retracted, and when the support leg is in the folded state, the second locking member is in an extended state, so that the second locking member is capable of being engaged with the headrest, thereby limiting a lower adjustment height of the headrest.

Furthermore, the headrest is disposed on an inner side of the backrest, an outer side of the backrest is provided with a blocking block connected to the headrest, and the blocking block is adapted to move up and down following the headrest. The blocking block includes an upper limiting surface that is adapted to be engaged with the first locking member, or the blocking block includes a lower limiting surface that is adapted to be engaged with the second locking member.

Furthermore, the outer side of the backrest is provided with a track in sliding fit with the blocking block.

Furthermore, the headrest limiting device further includes: a first locking assembly including: a first elastic restoring member mounted on the backrest and connected to the first locking member; a first pulling rope having a first end and a second end, the first end being connected to a first connection point of the support leg, and the second end being operably connected to the first elastic restoring member, when the support leg is in the unfolded state, the first elastic restoring member maintains the first locking member in the extended state, and when the support leg is in the folded state, the first elastic restoring member is subjected to a force from the first pulling rope and deformed, so that the first locking member is switched from the extended state to the retracted state; or, a second locking assembly including: a second clastic restoring member mounted on the backrest and connected to the second locking member; a second pulling rope having a first end and a second end, the first end being connected to a second connection point of the support leg, and the second end being operably connected to the second clastic restoring member, when the support leg is in the folded state, the second elastic restoring member maintains the second locking member in the extended state, and when the support leg is in the unfolded state, the second elastic restoring member is subjected to a force from the second pulling rope and deformed, so that the second locking member is switched from the extended state to the retracted state.

Furthermore, the first elastic restoring member is integrally formed with the first locking member, or the second elastic restoring member is integrally formed with the second locking member.

Furthermore, the support leg is pivotally connected to the base by a pivot point. The first connection point is disposed on a top portion of the support leg, and the first connection point and the pivot point are spaced apart by a first preset distance in a length direction of the support leg, or the second connection point is disposed on the top portion of the support leg, and the second connection point and the pivot point are spaced apart by a second preset distance in the length direction of the support leg.

Furthermore, a front end of the base is provided with a first guide portion through which the first pulling rope is engaged with the front end of the base, a length of the first pulling rope between the first guide portion and the first connection point when the support leg is in the unfolded state is smaller the length of the first pulling rope between the first guide portion and the first connection point when the support leg is in the folded state, or, the front end of the base is provided with a second guide portion through which the second pulling rope is engaged with the front end of the base, a length of the second pulling rope between the second guide portion and the second connection point when the support leg is in the folded state is smaller the length of the second pulling rope between the second guide portion and the second connection point when the support leg is in the unfolded state.

Furthermore, the seat is pivotally connected to the base through a hollow rotating shaft, the first pulling rope passes through the rotating shaft, or the second pulling rope passes through the rotating shaft.

Furthermore, the seat is fixed and connected to the base, a bottom of the base is provided with a first guide structure or a second guide structure, the first pulling rope passes through the first guide structure, and the second pulling rope passes through the second guide structure.

Furthermore, the first locking assembly further includes a first mounting seat mounted on the backrest and having a first receiving groove, the first elastic resetting member is located in the first receiving groove, and a groove bottom of the first receiving groove is provided with a first through hole for the first locking member to be extended or retracted; or, the second locking assembly further includes a second mounting seat mounted on the backrest and having a second receiving groove, the second elastic restoring member is located in the second receiving groove, and a groove bottom of the second receiving groove is provided with a second through hole for the second locking member to be extended or retracted.

Furthermore, a first driving pin is connected to the second end of the first pulling rope, and the first driving pin is received in the first receiving groove and is abutted against the first clastic restoring member; or, a second driving pin is connected to the second end of the second pulling rope, and the second driving pin is received in the second receiving groove and is abutted against the second elastic restoring member.

Furthermore, a groove wall of the first receiving groove is provided with a first slideway, and the first driving pin is in sliding fit with the first slideway; or a groove wall of the second receiving groove is provided with a second slideway, and the second driving pin is in sliding fit with the second slideway.

Furthermore, the first elastic restoring member is provided with a first opening, the second end of the first pulling rope is provided with a first connecting ring, and the first connecting ring is located in the first opening and sleeved on the first driving pin; or, the second elastic restoring member is provided with a second opening, the second end of the second pulling rope is provided with a second connecting ring, and the second connecting ring is located in the second opening and sleeved on the second driving pin.

Furthermore, a first end of the first clastic restoring member is connected to the first mounting seat, a second end of the first clastic restoring member is extended obliquely toward a groove bottom of the first mounting groove, and the first locking member is located on the second end of the first clastic restoring member; or, a first end of the second elastic restoring member is connected to the second mounting seat, a second end of the second elastic restoring member is extended obliquely toward a groove bottom of the second mounting groove, and the second locking member is located on the second end of the second elastic restoring member.

Furthermore, a height adjustment mechanism is disposed between the backrest and the headrest, the height adjustment mechanism allows the headrest to have an upper limit adjustment height and a lower limit adjustment height on the backrest. A height value of the upper limit adjustment height is greater than that of the upper adjustment height, or a height value of the lower limit adjustment height is less than that of the lower adjustment height.

Furthermore, the headrest is provided with a shoulder belt hole and a seatbelt restrainer. The lower limit adjustment height and the upper adjustment height correspond to a distance between a lower edge of the shoulder belt hole and an upper surface of a seat portion of the seat, or the upper limit adjustment height and the lower adjustment height correspond to a distance between a lower edge of the seatbelt restrainer and an upper surface of the seat portion of the seat.

DETAILED DESCRIPTION OF THE EMBODIMENTS

Figure 1:
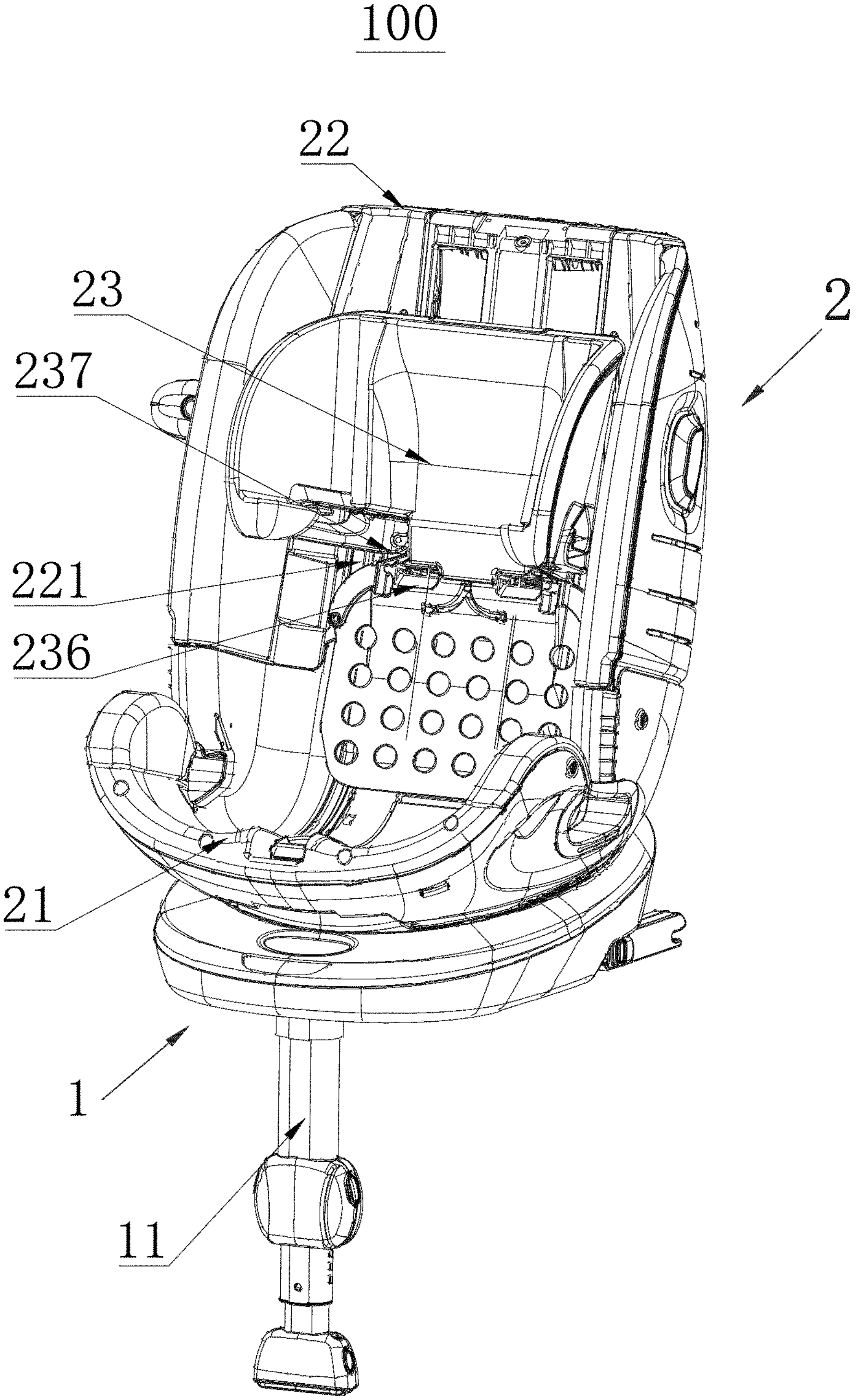
FIG. 1 is a schematic perspective view of a child safety seat according to an embodiment of the present application, schematically illustrating that the seat is mounted on the base in a forward direction, and the support leg is in an unfolded state.
Figure 2:
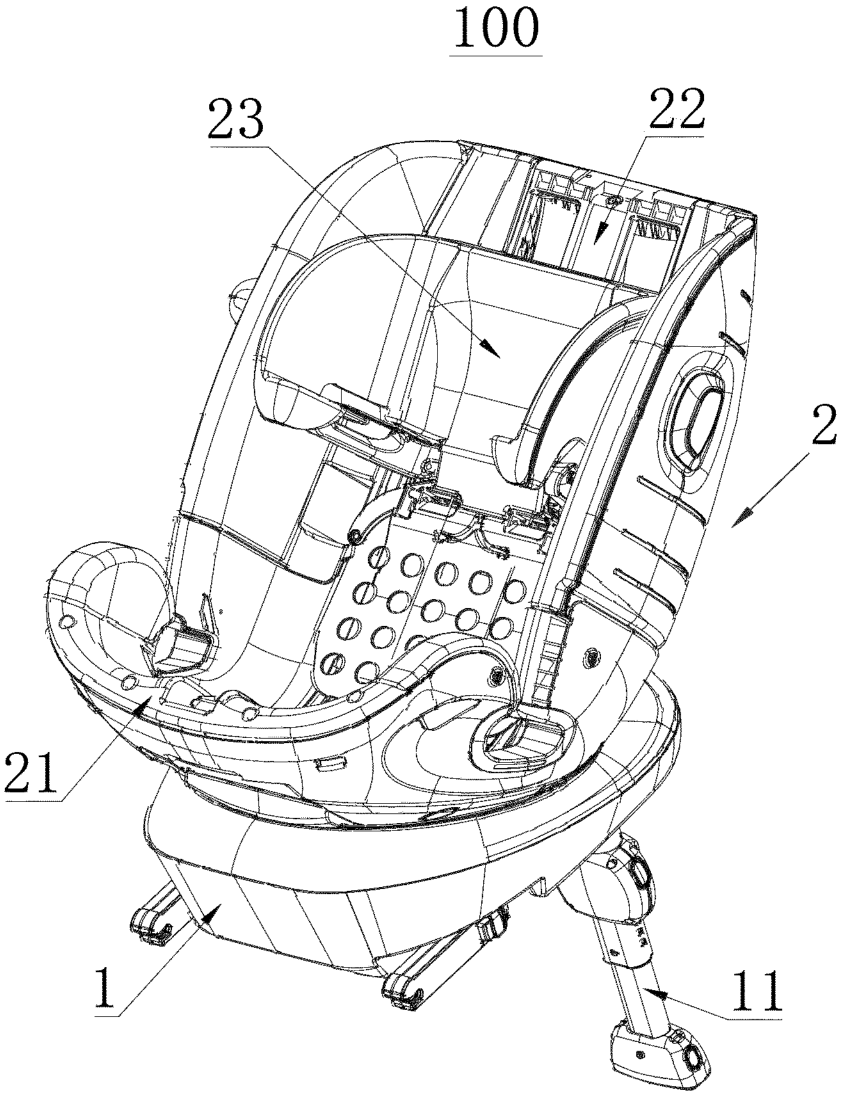
FIG. 2 is a schematic perspective view of a child safety seat according to an embodiment of the present application, schematically illustrating that the seat is mounted on the base in a reverse direction, and the support leg is in the unfolded state.
Figure 6:
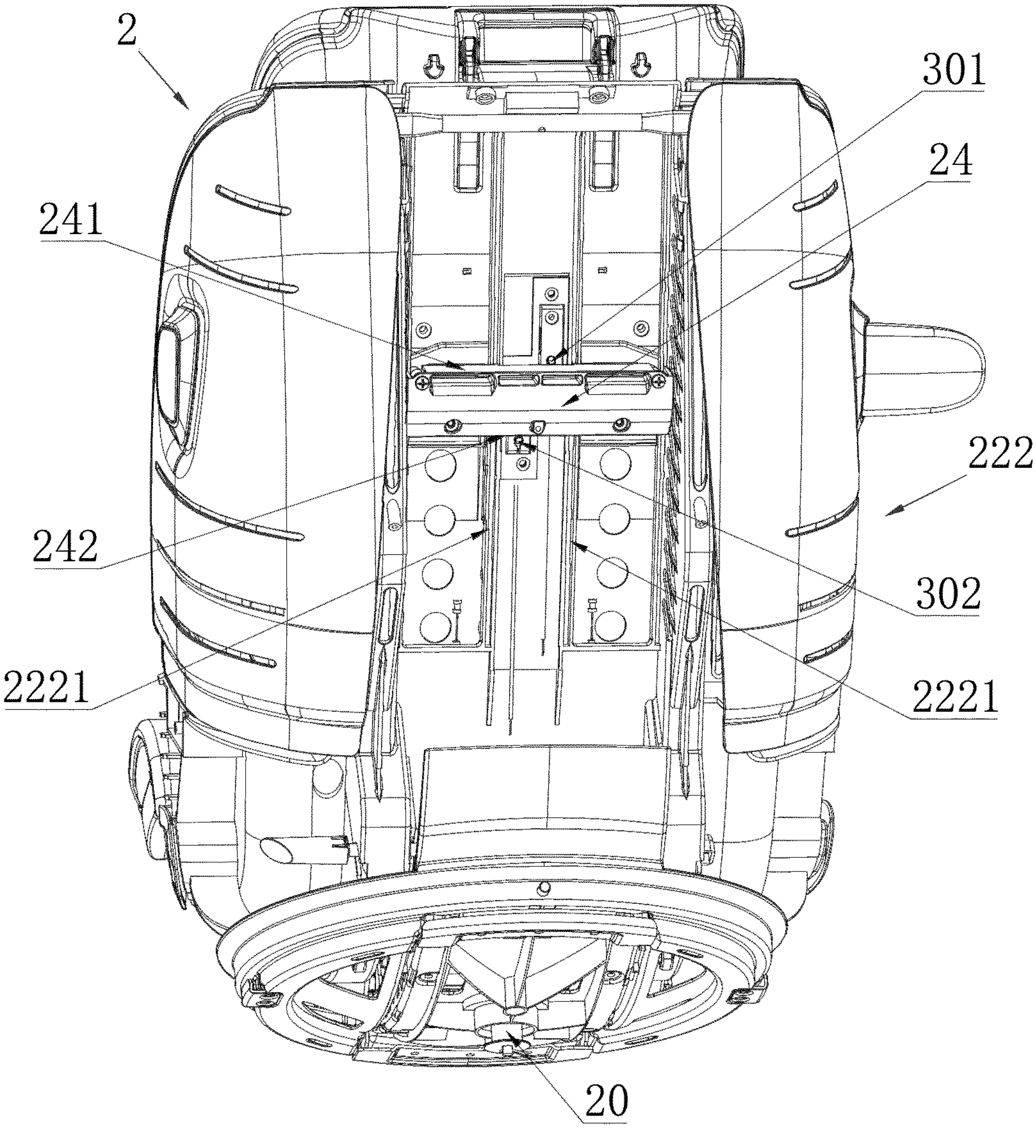
FIG. 6 is a schematic rear perspective view of a seat of a child safety seat according to an embodiment of the present application.

FIGS. 1, 2, and 6 show a structure of a child safety seat 100 according to an embodiment of the present application. The child safety seat 100 includes a base 1 and a seat 2. In this embodiment, the seat 2 is rotatably disposed on the base 1. In this case, the seat 2 may have a forward mounting position and a reverse mounting position with respect to the base 1. FIG. 1 shows a perspective view of the seat 2 mounted on the base 1 in a forward direction, it could be understood that the face of a child seated on the seat 2 mounted in the forward direction faces forward. FIG. 2 shows a perspective view of the seat 2 mounted on the base 1 in a reverse direction, it could be understood that the face of a child seated on the seat 2 mounted in the reverse direction faces backward. In other embodiments, the seat 2 may be fixed on the base 1 and thus cannot be rotated relative to the base 1.

It should be noted that, unless otherwise specified, orientation terms such as "front", "rear", "left", "right", "upper" and "lower" in this embodiment correspond to the directions of "front", "back", "left", "right", "up", "down" of the vehicle. These orientation terms are only intended to make the description of the embodiments of the present application clearer, and are not intended to improperly limit the protection scope of the present application.

Figure 3:
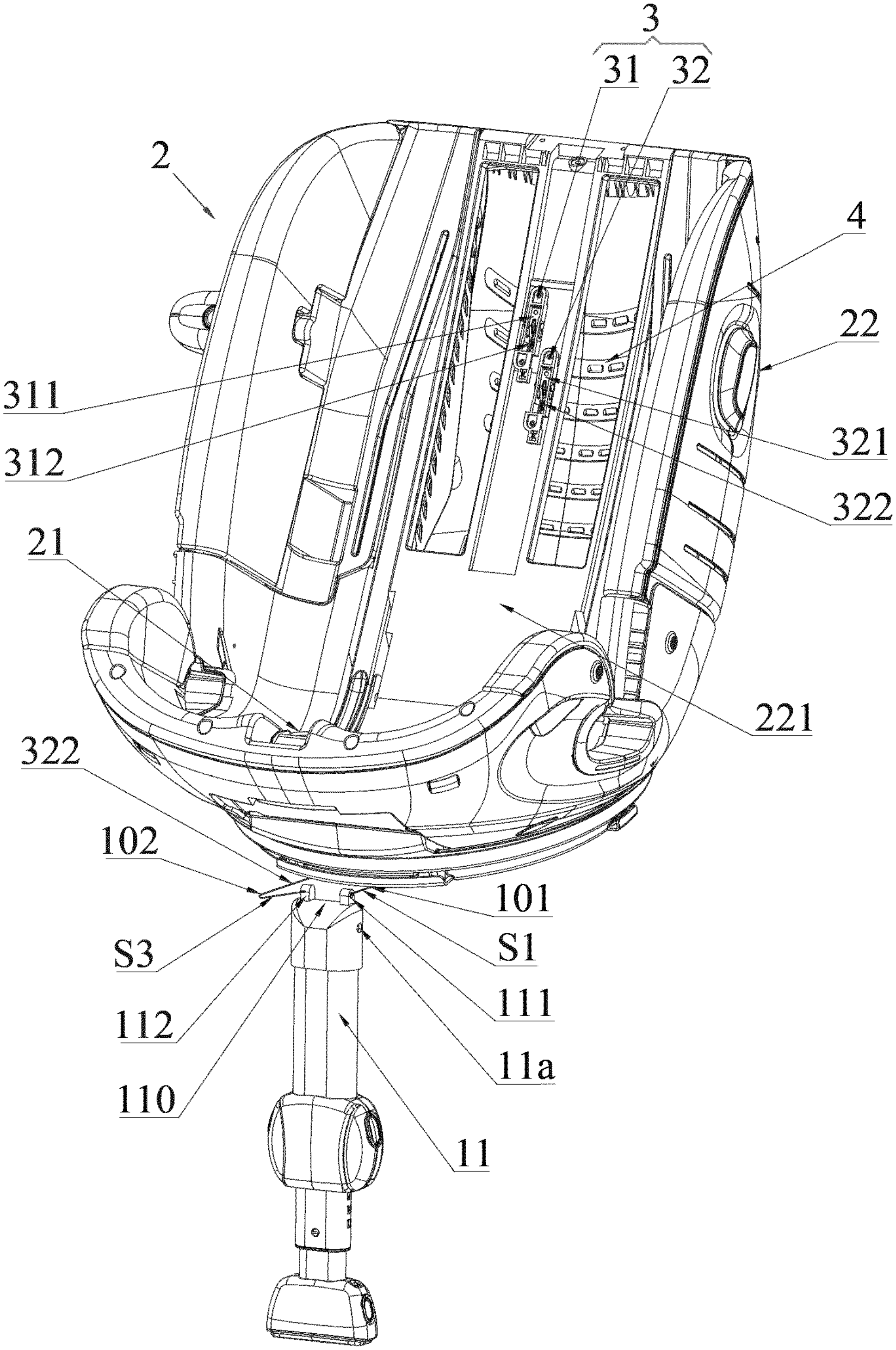
FIG. 3 is a schematic perspective view of a seat, a support leg, and a headrest limiting device of a child safety seat according to an embodiment of the present application, schematically illustrating that the seat is a forward mounting position and the support leg is in the unfolded state.
Figure 4:
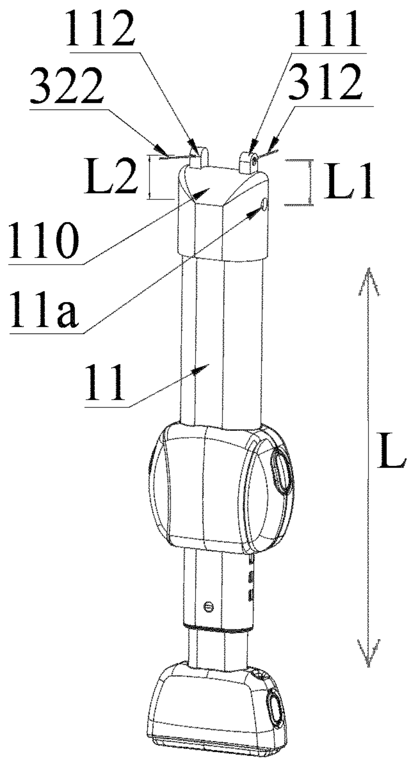
FIG. 4 is a schematic perspective view of a support leg of a child safety seat according to an embodiment of the present application.

Referring to FIGS. 3 and 4, a front end of the base 1 is provided with a pivotable support leg 11, which is pivotally connected to the base 1 by a pivot point 11*a*. The support leg 11 has an unfolded state (FIG. 1) and a folded state (FIG. 5) with respect to the base 1. The seat 2 has a seat portion 21 and a backrest 22 provided with a height-adjustable headrest 23, so that the headrest 23 may be adjusted according to the height of child. For example, a height adjustment mechanism 4 is disposed between the backrest 22 and the headrest 23, and the height adjustment mechanism 4 may be known in the art. The height adjustment mechanism 4 allows the height of the headrest 23 on the backrest 22 (see FIG. 17, a distance of the headrest 23 relative to an upper surface of the seat 21) to be adjusted, so as to adapt the headrest 23 to children of different heights. The height adjustment mechanism 4 allows the headrest 23 to have an upper limit adjustment height H3 and a lower limit adjustment height H4, and allows the headrest 23 to be fixed at any of a plurality of adjustment positions between the upper limit adjustment height H3 and the lower limit adjustment height H4. That is, a height adjustment range provided by the height adjustment mechanism 4 for the headrest 23 is in a range from H3 to H4.

Figure 5:
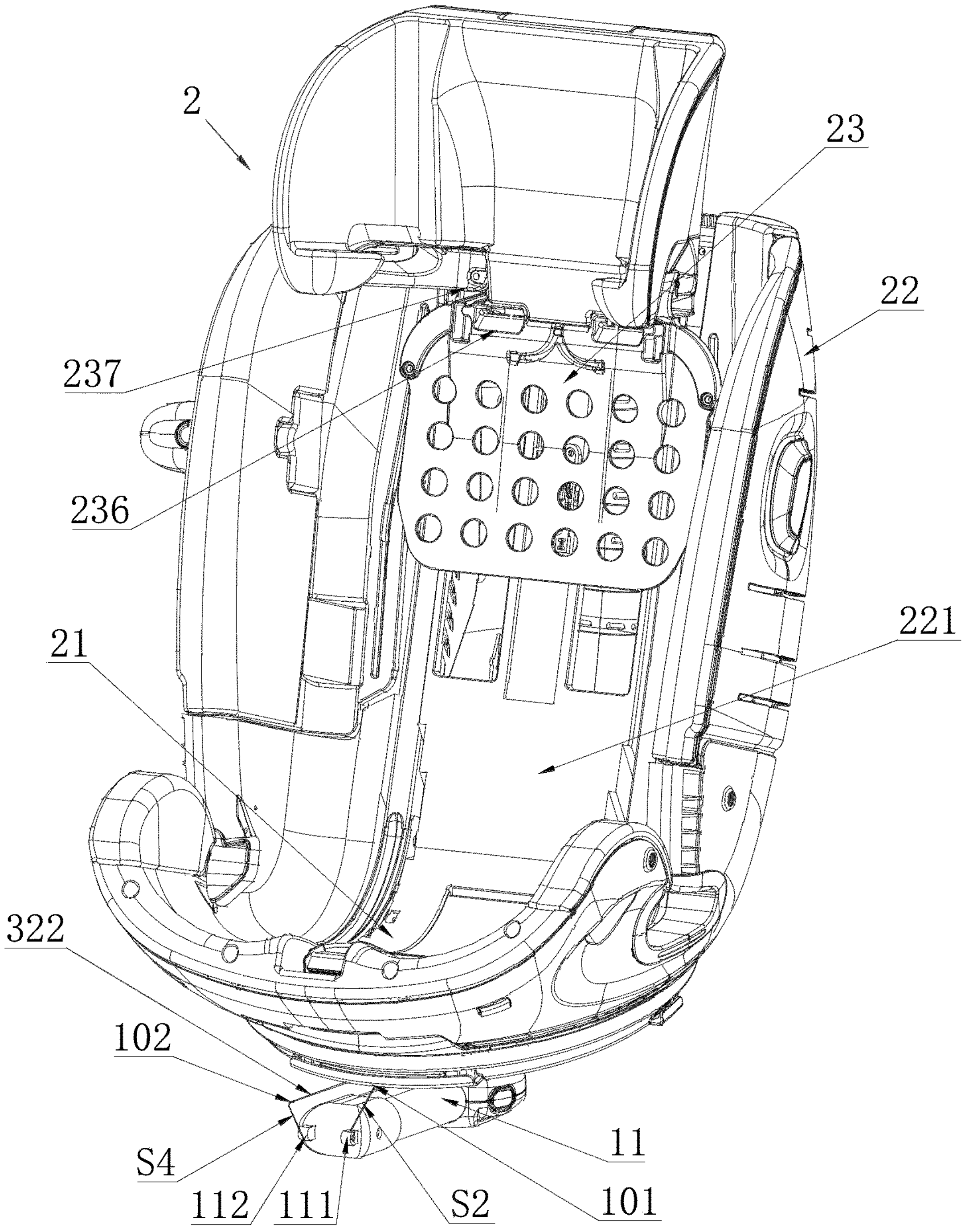
FIG. 5 is a schematic perspective view of a seat, a support leg, and a headrest limiting device of a child safety seat according to an embodiment of the present application, schematically illustrating that the seat is mounted on the base in a forward direction, and the support leg is in a folded state.
Figure 17:
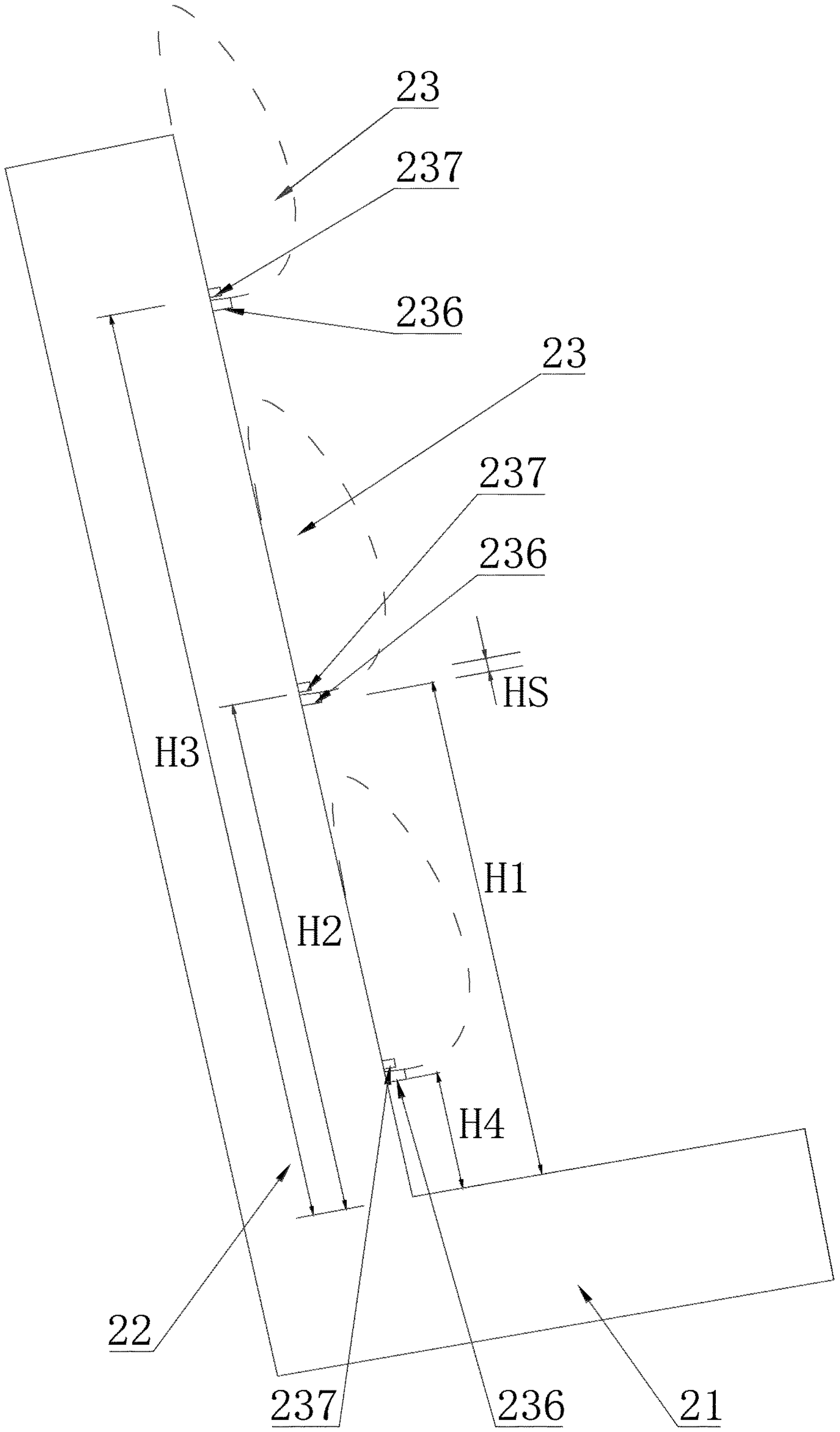
FIG. 17 schematically shows adjustment positions of a headrest in a child safety seat according to an embodiment of the present application.

Referring to FIGS. 1, 5, and 17, for the child safety seat 100 suitable for the height of young children (such as, 0 to 4 years of age) and older children (such as, 3 to 12 years old), the headrest 23 is provided with a seatbelt restrainer 237 and a shoulder belt hole 236, and the seatbelt restrainer 237 is located above the shoulder belt hole 236. When a young child is seated in the child safety seat 100 (for example, the support leg 11 needs to be unfolded in this case), the seatbelt of the child safety seat 100 passes through the shoulder belt hole 236, and the child safety seat 100 secures the child in the child safety seat 100 by a self-configured seatbelt. When an older child is seated in the child safety seat 100, the seatbelt of the vehicle seat passes through the seatbelt restrainer 237 when engaged with the child safety seat 100. By means of the shoulder belt hole 236 or the seatbelt restrainer 237, the seatbelt of the vehicle seat provides reliable protection to the child seated in the child safety seat 100 without affecting the child's riding comfort.

In the art, when the headrest 23 is used for young children, the height of the headrest 23 generally refers to a distance between a lower edge of the shoulder belt hole 236 and an upper surface of the seat portion 21. The lower limit adjustment height H4 refers to, for example, the minimum distance between from the lower edge of the shoulder belt hole 236 to the upper surface of the seat portion 21. When the headrest 23 is used for older children, the height of the headrest 23 generally refers to a distance between a lower edge of the seatbelt restrainer 237 and the upper surface of the seat portion 21. The upper limit adjustment height H3 refers to, for example, the maximum distance from the lower edge of the seatbelt restrainer 237 to the upper surface of the seat portion 21.

The child safety seat 100 further includes a headrest limiting device 3 operably connected to the support leg 11. The headrest limiting device 3 has different working states according to the change of the working mode (unfolded or folded) of the support leg 11.

Figure 7:
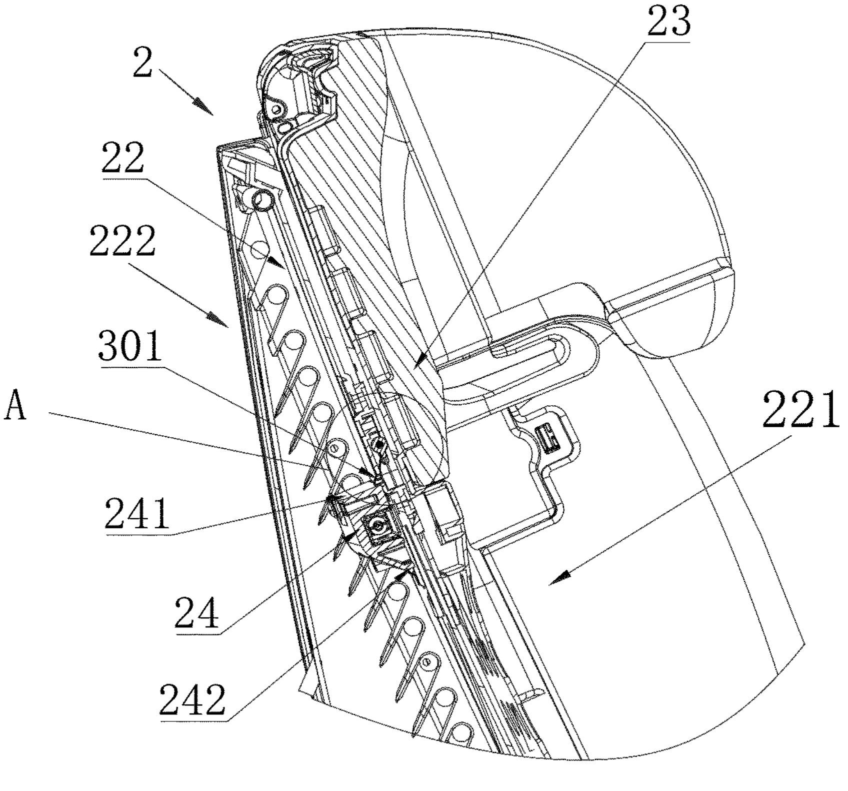
FIG. 7 is a schematic partial longitudinal cross-sectional view of a child safety seat according to an embodiment of the present application at a first locking assembly.
Figure 8:
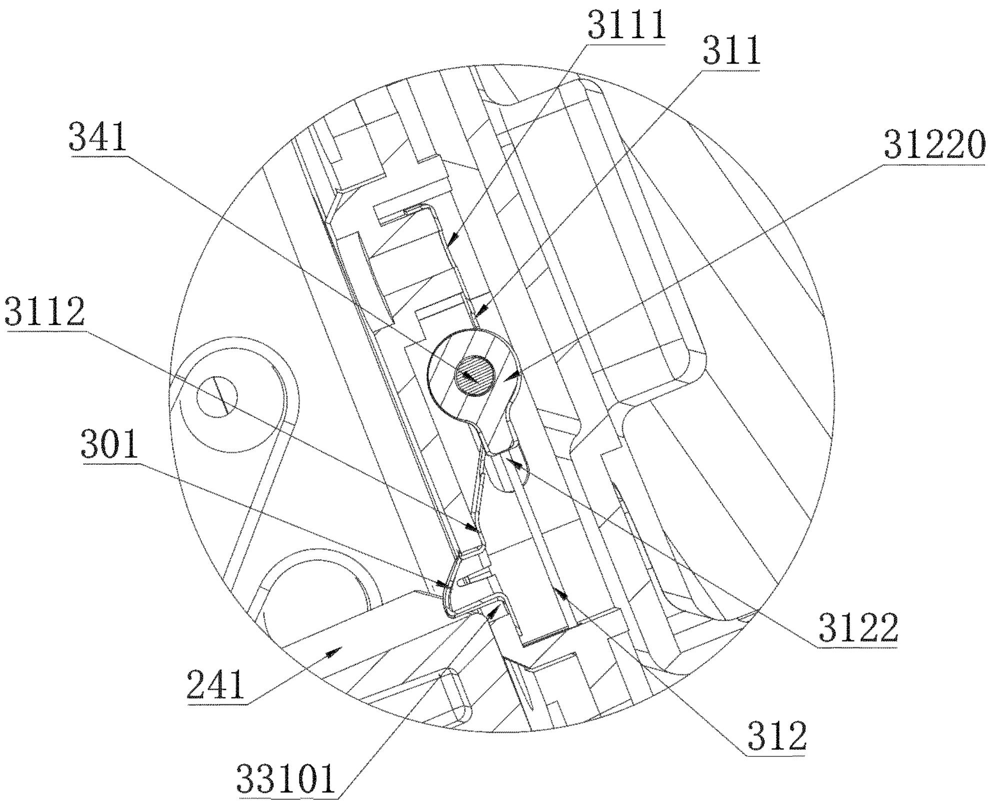
FIG. 8 a schematic enlarged view at position A in FIG. 7.
Figure 9:
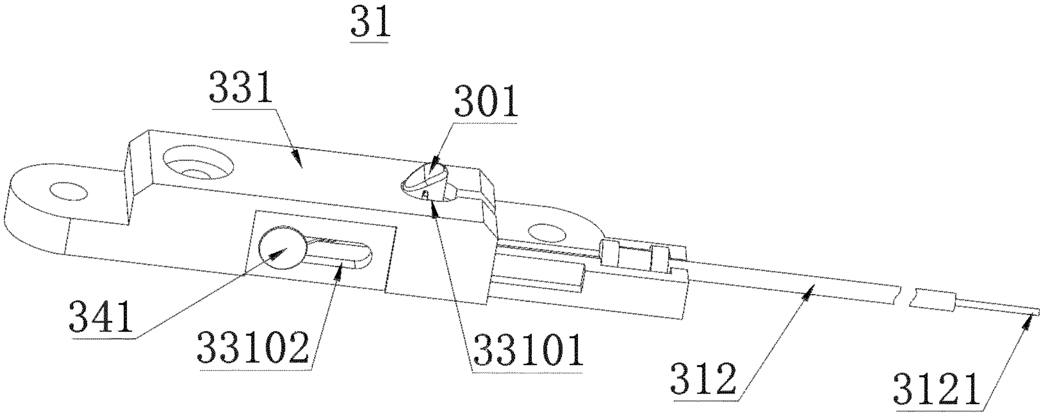
FIG. 9 is a schematic first perspective view of a first locking assembly of a child safety seat according to an embodiment of the present application.
Figure 12:
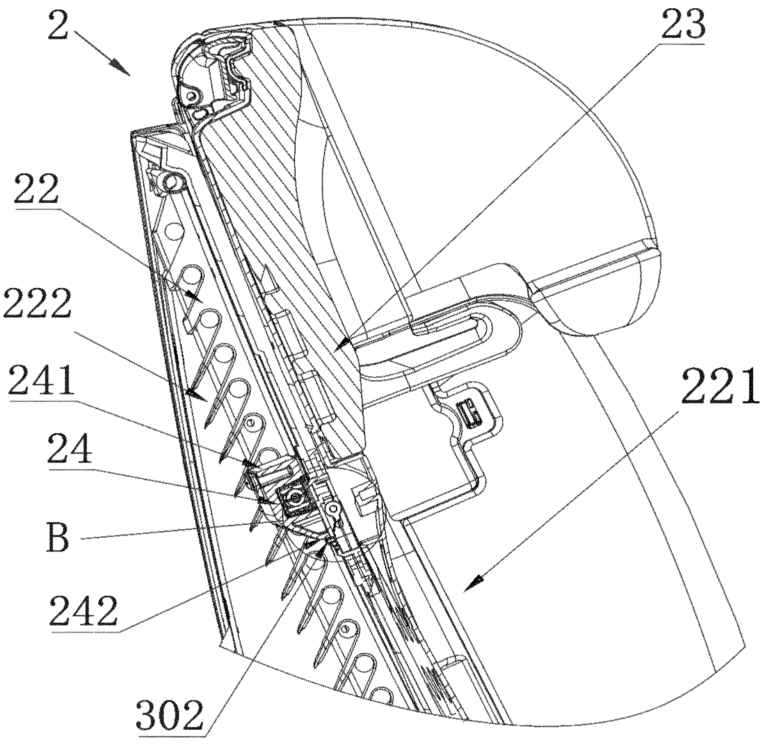
FIG. 12 is a schematic partial longitudinal cross-sectional view of a child safety seat according to an embodiment of the present application at a second locking assembly.
Figure 13:
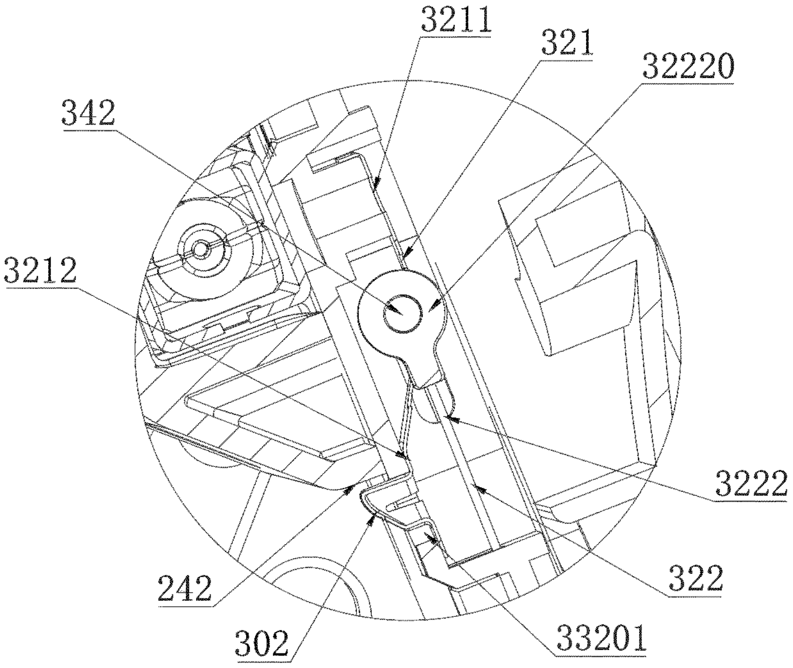
FIG. 13 a schematic enlarged view at position B in FIG. 12.

In this embodiment, referring to FIGS. 7, 8, and 17, the headrest limiting device 3 has a first locking member 301. When the support leg 11 is in the unfolded state, the first locking member 301 is in an extended state, so as to be engaged with the headrest 23, thereby limiting an upper adjustment height H1 of the headrest 23 (in connection with the above, the upper adjustment height H1 refers to, for example, a distance from a lower edge of the shoulder belt hole 236 to the upper surface of the seat portion 21). When the support leg 11 is in the folded state, the first locking member 301 is in a retracted state. Referring to FIGS. 12, 13, and 17, the headrest limiting device 3 has a second locking member 302. When the support leg 11 is in the unfolded state, the second locking member 302 is in the retracted state. When the support leg 302 is in the folded state, the second locking member 302 is in the extended state, so as to be engaged with the headrest 23, thereby limiting a lower adjustment height H2 of the headrest 23 (in connection with the above, the lower adjustment height H2 refers to, for example, a distance from the lower edge of the seatbelt restrainer 237 to the upper surface of the seat portion 21). A height value of the upper limit adjustment height H3 is greater than a height value of the upper adjustment height H1, and the height value of the upper adjustment height H1 is greater than a height value of the lower limit adjustment height H4; and the height value of lower limit adjustment height H4 is smaller than a height value of the lower adjustment height H2, and the height value of the lower adjustment height H2 is smaller than the height value of the upper limit adjustment height H3.

Generally, the child safety seat 100 is more suitable for young children (such as, infants), when supported by the support leg 11 (i.e., the support leg 11 is in the unfolded state in the use state of the child safety seat 100). In this case, the headrest 23 needs to be adjusted to a lower position range. The child safety seat 100 is more suitable for older children, when not supported by the support leg 11 (i.e., the support leg 11 is in the folded state in the use state of the child safety seat 100). In this case, the headrest needs to be adjusted to a higher position range.

In order to avoid improper use of the headrest 23 when the support leg 11 of the child safety seat 100 is in different modes, in an embodiment of the present application, the headrest limiting device 3 is configured to be operably connected to the support leg 11. When the support leg 11 is in the unfolded state for children to ride, the first locking member 301 of the headrest limiting device 3 is in the extended state and the second locking member 302 of the headrest limiting device 3 is in the retracted state, thereby limiting the upper adjustment height H1 of the headrest 23 when the support leg 11 is in the unfolded state. In this case, the height adjustment range of the headrest 23 is, for example, in a range from H4 to H1 (for example, in a range from 274 mm to 391 mm). As a result, when the infant child is seated in the child safety seat, the improper use of the headrest caused by the parent adjusting the headrest 23 too high is avoided, thereby improving the safety and comfort of infants. When the support leg 11 is in the folded state for older children to ride, the second locking member 302 of the headrest limiting device 3 is in the extended state and the first locking member 301 of the headrest limiting device 3 is in the retracted state, thereby limiting the lower adjustment height H2 of the headrest 23 when the support leg 11 is in the folded state. In this case, the height adjustment range of the headrest 23 is, for example, in a range from H2 to H3 (for example, in a range from 324 mm to 533 mm). As a result, when the older child is seated in the child safety seat, the improper use of the headrest caused by the parent adjusting the headrest 23 too low is avoided, thereby improving the safety and comfort of infants.

In some embodiments, a height difference HS between the upper adjustment height H1 and the lower adjustment height H2 is not equal to a height difference between the lower edge of the seatbelt restrainer 237 and the lower edge of the shoulder belt hole 236, and even the height value of the upper adjustment height H1 is greater than the height value of the lower adjustment height H2. That is, the position adjustment range of the headrest 23 when the support leg 11 is in the unfolded state and the position adjustment range of the headrest 23 when the support legs 11 is in the folded state may be partially overlapping. In other embodiments (e.g., as shown in FIG. 17), the height difference HS of the upper adjustment height H1 and the lower adjustment height H2 is, for example, equal to the height difference of the lower edge of the seatbelt restrainer 237 and the lower edge of the shoulder belt hole 236.

Referring to FIGS. 1 and 6, the headrest 23 is disposed on an inner side 221 of the backrest 22, and an outer side 222 of the backrest 22 is provided with a blocking block 24 connected to the headrest 23, and the blocking block 24 is adapted to move up and down following the headrest 23. The blocking block 24 is detachably connected to the headrest 23, for example, by means of a bolt (not numbered in figures), the outer side 222 of the backrest 22 is provided with, for example, a track 2221 in sliding fit with the blocking block 24. The blocking block 24 includes an upper limiting surface 241 that is adapted to be engaged with the first locking member 301, and the blocking block may further include a lower limiting surface 242 that is adapted to be engaged with the second locking member 302. As a result, the first locking member 301, the second locking member 302 is indirectly engaged with the headrest 23 by the blocking block 24, thereby limiting the upper adjustment height H1 and the lower adjustment height H2 of the headrest 23. The blocking block 24 adapted to move following the headrest 23 is disposed on the outer side 222 of the backrest 22, so that the extension directions of the first locking member 301 and the second locking member 302 are both configured to face the direction away from the back of the child passenger. On the one hand, the outer space of the backrest 22 is fully utilized, and on the other hand, the structure of the headrest 23 itself is not greatly affected.

Referring to FIG. 3, the headrest limiting device 3 may further include a first locking assembly 31 and a second locking assembly 32. FIGS. 7 to 11 show a preferred embodiment of the first locking assembly 31, and FIGS. 12 to 15 show a preferred embodiment of the second locking assembly 32.

Referring to FIGS. 3, 4, 7 to 11, and 16, the first locking assembly 31 may include a first elastic restoring member 311 and a first pulling rope 312. The first elastic restoring member 311 is mounted on the backrest 22 and connected to the first locking member 301. The first elastic restoring member 311 may be, for example, an elastic sheet and made of metal or plastic or other suitable material. The first locking member 301 may be a locking pin, which is attached to or integrally formed with the first elastic restoring member 311. The first pulling rope 312 may be, for example, a steel wire, a first end 3121 of the first pulling rope 312 is connected to a first connection point 111 of the support leg, and the second end 3122 of the first pulling rope 312 is operably connected to the first elastic restoring member 311. It should be noted that the operable connection between the first pulling rope 312 and the first elastic restoring member 311 may be a direct connection, an indirect connection, a direct contact or an indirect contact, etc., such that an active action of one of the first pulling rope 312 and the first elastic restoring member 311 causes a passive action of the other.

By reasonably setting the path of the first pulling rope 312, the first locking assembly 31 meets the following conditions: when the support leg 11 is in the unfolded state (as described above, generally corresponding to the situation of infants riding, it is necessary to control the position of the headrest 23 not to be too high), the first clastic restoring member 311 maintains the first locking member 301 in the extended state. When the headrest 23 moves from bottom to top and reaches the upper adjustment height H1, the first locking member 301 is abutted against the upper limiting surface 241, thereby restricting the headrest 23 from moving higher than the upper adjustment height H1. When the support leg 11 is switched from the unfolded state to the folded state, the support leg 11 pulls the first pulling rope 312, and the first elastic restoring member 311 is subjected to a force from the first pulling rope 312 and deformed elastically, and the elastic deformation of the first clastic restoring member 311 drives the first locking member 301 to be switched from the extended state to the retracted state. In this case, the first locking member 301 no longer restricts the headrest 23 from moving higher than the upper adjustment height H1. It could be understood that when the support leg 11 is switched from the folded state to the unfolded state, the first clastic restoring member 311 may reversely pull the first pulling rope 312 under the action of clastic restoring force, and bring the first locking member 301 return to the extended state.

Referring to FIGS. 3, 4, and 12 to 16, the second locking assembly 32 includes a second elastic restoring member 321 and a second pulling rope 322. The second elastic restoring member 321 is mounted on the backrest 22 and connected to the second locking member 302. The second elastic restoring member 321 may be, for example, an elastic sheet and made of metal or plastic or other suitable material. The second locking member 302 may be a locking pin, which is attached to or integrally formed with the second elastic restoring member 321. The second pulling rope 322 may be, for example, a steel wire, a first end 3221 of the second pulling rope 322 is connected to a second connection point 112 of the support leg 11, and the second end 3222 of the second pulling rope 312 is operably connected to the second elastic restoring member 321. It should be noted that the operable connection between the second pulling rope 322 and the second elastic restoring member 321 may be a direct connection, an indirect connection, a direct contact or an indirect contact, etc., such that an active action of one of the second pulling rope 322 and the second elastic restoring member 321 causes a passive action of the other.

By reasonably setting the path of the second pulling rope 322, the second locking assembly 32 meets the following conditions: when the support leg 11 is in the folded state (as described above, generally corresponding to the situation of older children riding, it is necessary to control the position of the headrest 23 not to be too low), the second elastic restoring member 321 maintains the second locking member 302 in the extended state. When the headrest 23 moves from top to bottom and reaches the lower adjustment height H2, the second locking member 302 is abutted against the lower limiting surface 242, thereby restricting the headrest 23 from moving lower than the lower adjustment height H2. When the support leg 11 is switched from the folded state to the unfolded state, the support leg 11 pulls the second pulling rope 322, and the second clastic restoring member 321 is subjected to a force from the second pulling rope 322 and deformed elastically, and the clastic deformation of the second elastic restoring member 321 drives the second locking member 302 to be switched from the extended state to the retracted state. In this case, the second locking member 302 no longer restricts the headrest 23 from moving lower than the lower adjustment height H2. It could be understood that when the support leg 11 is switched from the unfolded state to the folded state, the second elastic restoring member 321 may reversely pull the second pulling rope 322 under the action of elastic restoring force, and bring the second locking member 302 return to the extended state.

Referring to FIGS. 3 to 5, in this embodiment, the first connection point 111 is disposed on a top portion 110 of the support leg 11, and the first connection point 111 and the pivot point 11*a* of the support leg 11 are spaced apart by a first preset distance L1 in a length direction L of the support leg 11. The second connection point 112 is disposed on the top portion 110 of the support leg 11, and the second connection point 112 and the pivot point 11*a* of the support leg 11 are spaced apart by a second preset distance L2 in the length direction L of the support leg 11. In some embodiments, the first preset distance L1 is equal to the second preset distance L2. In some embodiments, the first connection point 111 and the second connection point 112 may be the same connection point.

Figure 16:
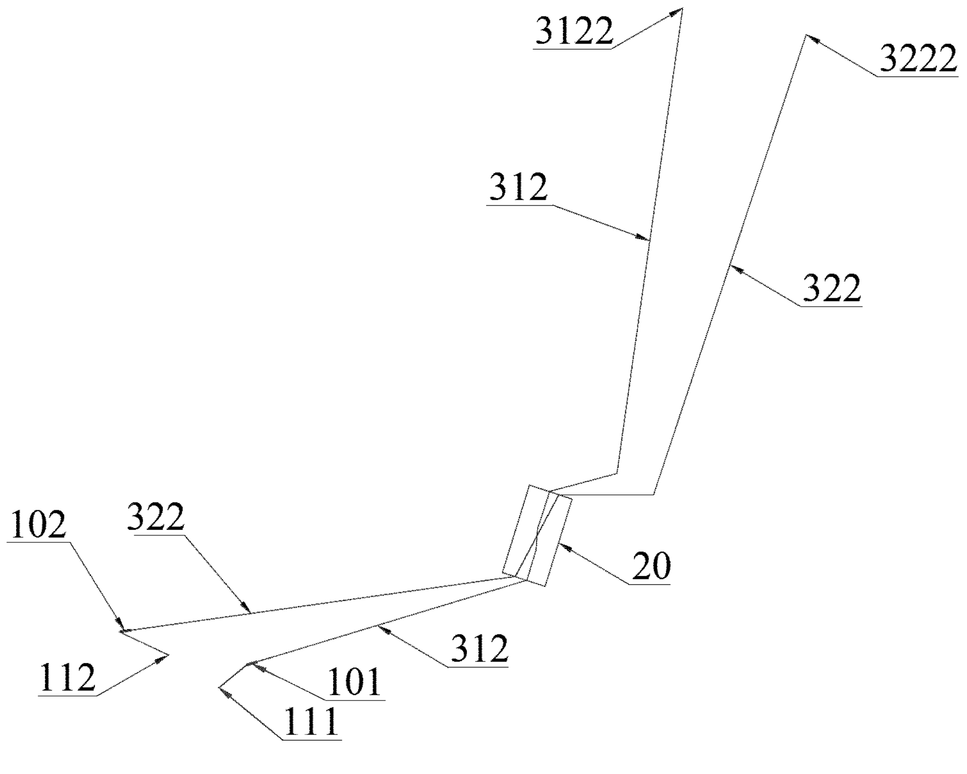
FIG. 16 schematically shows paths of the first pulling rope and the second pulling rope when a support leg of a child safety seat according to the embodiment of the present application is in an unfolded state and the seat is in a forward mounting state.

Referring to FIGS. 3, 5, and 16, in this embodiment, the first pulling rope 312 and the second pulling rope 322, for example, may be configured as follows.

A first guide portion 101 is disposed on a front end of a bottom portion of the base 1 (for case of understanding, the base 1 is not shown in FIGS. 3 and 5), and the first pulling rope 312 is engaged with the front end of the base 1 through the first guide portion 101. The first guide portion 101 is, for example, located behind the first connection point 111. When the support leg 11 is in the unfolded state, a length of the first pulling rope between the first guide portion 101 and the first connection point 111 is relatively small, and when the support leg 11 is in the folded state, the length of the first pulling rope between the first guide portion 101 and the first connection point 111 is relatively great. In FIG. 3, S1 indicates the length of the first pulling rope 312 between the first guide portion 101 and the first connection point 111 when the support leg 11 is in the unfolded state. In FIG. 5, S2 indicates the length of the first pulling rope 312 between the first guide portion 101 and the first connection point 111 when the support leg 11 is in the folded state. S1 is less than S2. The second end 3122 of the first pulling rope 312 extends upwardly through the first guide portion 101 and the bottom portion of the base 1, and is connected to the first elastic restoring member 311.

A second guide portion 102 is disposed on the front end of the bottom portion of the base 1, and the second pulling rope 322 is engaged with the front end of the base 1 through the second guide portion 102. The second guide portion 102 is, for example, located in front of the second connection point 112. When the support leg 11 is in the unfolded state, a length of the second pulling rope between the second guide portion 102 and the second connection point 112 is relatively great, and when the support leg 11 is in the folded state, the length of the second rope between the second guide portion 102 and the second connection point 112 is relatively small. In FIG. 3, S3 indicates the length of the second pulling rope 322 between the second guide portion 102 and the second connection point 112 when the support leg 11 is in the unfolded state. In FIG. 5, S4 indicates the length of the second pulling rope 322 between the second guide portion 102 and the second connection point 112 when the support leg 11 is in the folded state. S3 is greater than S4. The second end 3222 of the second pulling rope 322 extends upwardly through the second guide portion 102 and the bottom portion of the base 1, and is connected to the second elastic restoring member 321.

Referring to FIG. 6, in this embodiment, the seat 2 is pivotally connected to the base 1 through a hollow rotating shaft 20, and for example, the seat 2 is capable of being rotated 360°. In this case, the second end 3122 of the first pulling rope 312 is operably connected to the first elastic restoring member 311 after passing through a central hole of a rotating shaft 20, and the second end 3222 of the second pulling rope 322 may be operably connected to the second elastic restoring member 321 after passing through the central hole of the rotating shaft 20. As a result, the first locking assembly 31 and the second locking assembly 32 operate normally regardless of whether the seat 2 is in the forward mounting position or in the reverse mounting position. Referring to FIG. 16, it can be seen that in this embodiment, the first pulling rope 312 and the second pulling rope 322 intersect with each other in the rotating shaft 20. However, in other embodiments, the first pulling rope 312 and the second pulling rope 322 may use other suitable paths in which the first pulling rope 312 and the second pulling rope 322 may not intersect with each other.

Referring to FIGS. 8 to 11, in this embodiment, the first locking assembly 31 may further include a first mounting seat 331 mounted on the backrest 22 and having a first receiving groove 3310 in which the first clastic restoring member 311 is located. The first elastic restoring member 311 is mounted on the backrest 22 through the first mounting seat 331, and the first elastic restoring member 311 in the first receiving groove 3310 is not easily interfered by other components. A groove bottom of the first receiving groove 3310 is provided with a first through hole 33101 for the first locking member 301 to be extended or retracted. When the first locking member 301 is extended from the first through hole 33101, the first locking member 301 is in the extended state, so as to be engaged with the headrest 23 or the blocking block 24. When the first locking member 301 is retracted from the first through hole 33101, the first locking member 301 is in a retracted state.

Figure 14:
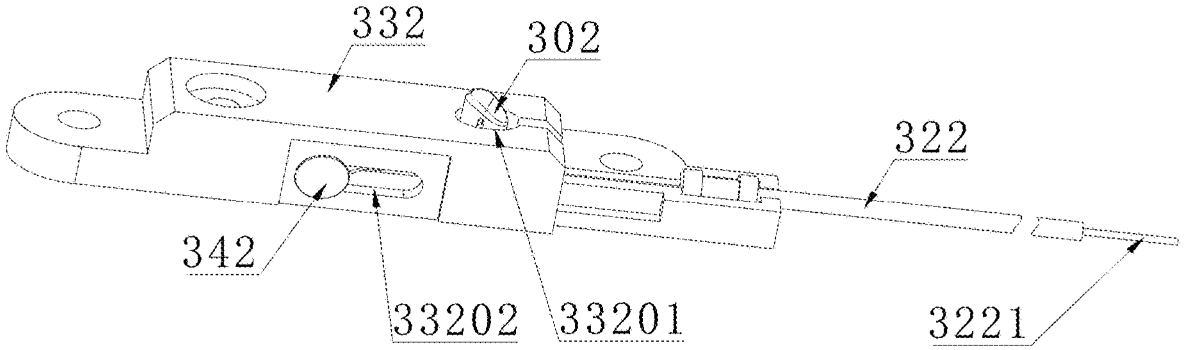
FIG. 14 is a schematic perspective view of a second locking assembly of a child safety seat according to an embodiment of the present application.
Figure 15:
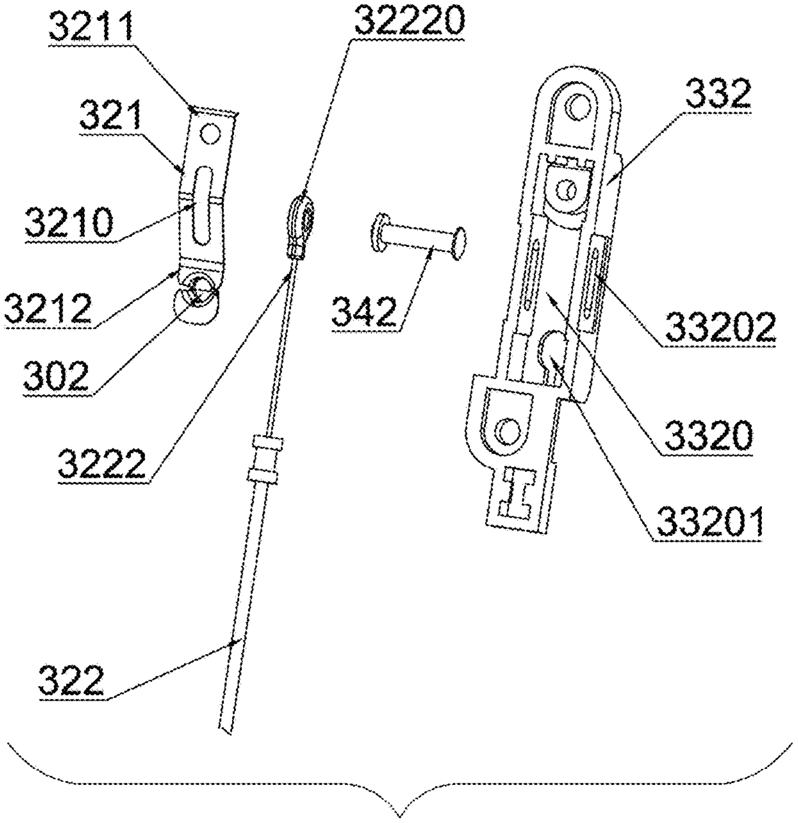
FIG. 15 is a schematic exploded view of a second locking assembly of a child safety seat according to an embodiment of the present application.

Referring to FIGS. 13 to 15, in this embodiment, the second locking assembly 32 may further include a second mounting seat 332 mounted on the backrest 22 and having a second receiving groove 3320 in which the second elastic restoring member 321 is located. The second elastic restoring member 321 is mounted on the backrest 22 through the second mounting seat 332, and the second clastic restoring member 321 in the second receiving groove 3320 is not easily interfered by other components. A groove bottom of the second receiving groove 3320 is provided with a second through hole 33201 for the second locking member 302 to be extended or retracted. It could be understood that when the second locking member 302 is extended from the second through hole 33201, the second locking member 302 is in the extended state, so as to be engaged with the headrest 23 or the blocking block 24. When the second locking member 302 is retracted from the first through hole 33201, the second locking member 302 is in a retracted state.

This embodiment also shows an operable connection of the first pulling rope 312 and the first elastic restoring member 311, and an operable connection of the second pulling rope 322 and the second elastic restoring member 321.

Figure 10:
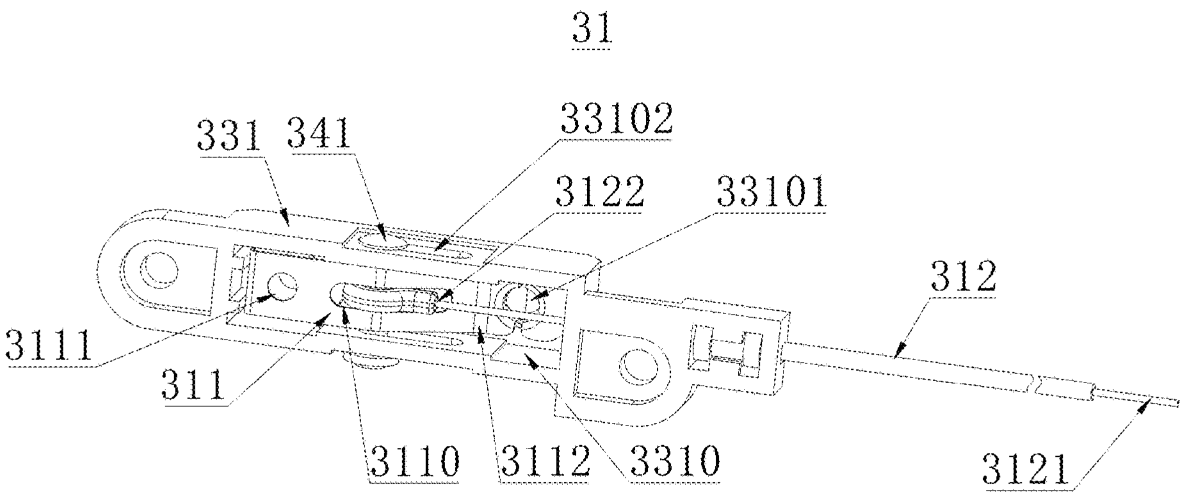
FIG. 10 is a schematic second perspective view of a first locking assembly of a child safety seat according to an embodiment of the present application.
Figure 11:
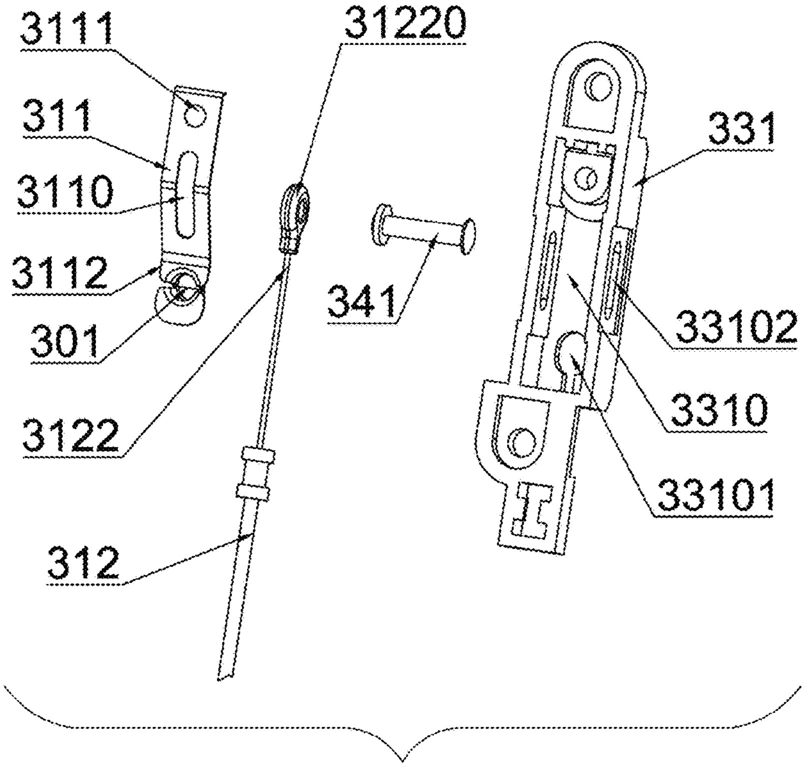
FIG. 11 is a schematic exploded view of a first locking assembly of a child safety seat according to an embodiment of the present application.

Referring to FIGS. 10 and 11, the second end 3122 of the first pulling rope 312 is connected to a first driving pin 341, and the first pulling rope 312 interacts with the first driving pin 341 through the first elastic restoring member 311. In some embodiments, the first driving pin 341 is received in the first receiving groove 3310 and is abutted against the first elastic restoring member 311. When the support leg 11 is switched from the unfolded state to the folded state, the first pulling rope 312 drives the first elastic restoring member 311 to be deformed by the first driving pin 341, so that the first locking member 301 is retracted from the first through hole 33101.

In some embodiments, a groove wall of the first receiving groove 3310 is provided with a first slideway 33102, and the first driving pin 341 is in sliding fit with the first slideway 33102. The first slideway 33102 is, for example, an elongated hole, and a stroke provided by the first slideway 33102 for the first driving pin 341 is, for example, equal to the difference between the above-mentioned S1 and S2. Referring to FIG. 8, when the support leg 11 is switched from the unfolded state to the folded state, the first pulling rope 312 pulls the first driving pin 341 to move rightward and downward along the first slideway 33102, and the first driving pin 341 exerts a force on the first clastic restoring member 311 during the movement, so that the first locking member 301 moves rightward and upward, and is retracted from the first through hole 33101. As a result, when the support leg 11 of the child safety seat is folded for older children to ride, the first locking member 301 no longer restricts headrest 23 from moving upward.

In some embodiments, a middle portion of the first elastic restoring member 311 is provided with a first opening 3110, and the second end 3122 of the first pulling rope 312 is provided with a first connecting ring 31220, and the first connecting ring 31220 is located in the first opening 3110 and sleeved on the first driving pin 341.

In some embodiments, the first end 3111 of the first clastic restoring member 311 is, for example, riveted or welded together with the first mounting seat 331, and the second end 3112 of the first clastic restoring member 311 is extended obliquely toward the groove bottom of the first mounting groove 3310, thereby having an inclined surface. A first locking member 301 is located on the second end 3112 of the first elastic restoring member 311. When the pulling force received by the first driving pin 341 from the first pulling rope 312 is greater than the pressing force received by the first driving pin 341 from the first elastic restoring member 311, the first driving pin 341 slides in the first slideway 33102 and pushes the inclined surface of the first elastic restoring member 311 at the same time, so that the inclined surface of the first clastic restoring member 311 is elastically deformed, and the first locking member 301 is forced to be retracted from the first through hole 33101. When the pulling force received by the first driving pin 341 from the first pulling rope 312 is smaller than the pressing force received by the first driving pin 341 from the first elastic restoring member 311, the inclined surface of the first elastic restoring member 311 drives the first driving pin 341 to slide reversely in the first slideway 33102, and at the same time, the first locking member 301 is extended from the first through hole 33101.

Referring to FIG. 15, the second end 3222 of the second pulling rope 322 is connected to a second driving pin 342 and the second pulling rope 322 interacts with the second driving pin 342 through the second clastic restoring member 321. In some embodiments, the second driving pin 342 is received in the second receiving groove 3320 and is abutted against the second clastic restoring member 321. When the support leg 11 is switched from the folded state to the unfolded state, the second pulling rope 322 drives the second elastic restoring member 321 to be deformed by the second driving pin 342, so that the second locking member 302 is retracted from the second through hole 33201.

In some embodiments, a groove wall of the second receiving groove 3320 is provided with a second slideway 33202, and the second driving pin 342 is in sliding fit with the second slideway 33202. The second slideway 33202 is, for example, an elongated hole, and a stroke provided by the second slideway 33202 for the second driving pin 342 is, for example, equal to the difference between the above-mentioned S3 and S4. Referring to FIG. 13, when the support leg 11 is switched from the folded state to the unfolded state, the second pulling rope 322 pulls the second driving pin 342 to move rightward and downward along the second slideway 33202, and the second driving pin 342 exerts a force on the second elastic restoring member 321 during the movement, so that the second locking member 302 moves rightward and upward, and is retracted from the second through hole 33201. When the support leg 11 of the child safety seat is unfolded for young children to ride, the second locking member 302 no longer restricts headrest 23 from moving downward.

In some embodiments, a middle portion of the second elastic restoring member 321 is provided with a second opening 3210, and the second end 3222 of the second pulling rope 322 is provided with a second connecting ring 32220, and the second connecting ring 32220 is located in the second opening 3210 and sleeved on the second driving pin 342.

In some embodiments, the first end 3211 of the second clastic restoring member 321 is, for example, riveted or welded together with the second mounting seat 332, and the second end 3212 of the second elastic restoring member 321 is extended obliquely toward the groove bottom of the second mounting groove 3320, thereby having an inclined surface. A second locking member 302 is located on the second end 3212 of the second clastic restoring member 321. When the pulling force received by the second driving pin 342 from the second pulling rope 322 is greater than the pressing force received by the second driving pin 342 from the second elastic restoring member 321, the second driving pin 342 slides in the second slideway 33202 and pushes the inclined surface of the second clastic restoring member 321 at the same time, so that the inclined surface of the second clastic restoring member 321 is elastically deformed, and the second locking member 302 is forced to be retracted from the second through hole 33201. When the pulling force received by the second driving pin 342 from the second pulling rope 322 is smaller than the pressing force received by the second driving pin 342 from the second elastic restoring member 321, the inclined surface of the second elastic restoring member 321 drives the second driving pin 342 to slide reversely in the second slideway 33202, and at the same time, the second locking member 302 is extended from the second through hole 33201.

The above-mentioned first mounting seat 331 and second mounting seat 332 may be disposed on the middle of the backrest 22 and be arranged to be spaced apart from left to right.

In this embodiment, the headrest limiting device 3 includes both a first locking member 301 and a second locking member 302. However, in practical applications, the headrest limiting device 3 may only include one of the first locking member 301 and the second locking member 302. Only one of the first locking assembly 31 and the second locking assembly 32 associated with the first locking member 301 and the second locking member 302, respectively, may be provided accordingly.

The headrest limiting device 3, the first locking assembly 31 and the second locking assembly 32 may have various embodiments in other embodiments, and are not limited to the above-described examples, as long as the object of the present application can be achieved.

In the above-mentioned embodiment, the first locking member 301 and the second locking member 302 are abutted against and engaged with the blocking block 24 to restrict the headrest 23 from moving upward and downward. In other embodiments, the blocking block 24 may not be provided, and the first locking member 301 and the second locking member 302 may be, for example, directly abutted against and engaged with the headrest 23 to restrict the headrest 23 from moving upward and downward.

In the above-mentioned embodiments, the child safety seat 100 in which the seat 2 is pivotally connected to the base 1 is used as an example for description. In other unshown embodiments, the headrest limiting device 3 of the embodiment of the present application may also be applied to the child safety seat 100 in which the seat 2 is fixedly connected to the base 1. In this case, a first guide structure or a second guide structure (not shown) may be disposed on the bottom portion of the base 1. The second end 3122 of the first pulling rope 312 passes through and is guided upward by the first guide structure, and then, is operably connected to the first elastic restoring member 311. The second end 3222 of the second pulling rope 322 passes through and is guided upward by the second guide structure, and then, is operably connected to the second elastic restoring member 321.

Each of the technical features of the above-mentioned embodiments may be combined arbitrarily. To simplify the description, not all the possible combinations of each of the technical features in the above embodiments are described. However, all of the combinations of these technical features should be considered as within the scope of this application, as long as such combinations do not contradict with each other.

The above embodiments merely illustrate several embodiments of the present application, and the description thereof is specific and detailed, but it shall not be constructed as limiting the scope of the present application.

It should be noted that a plurality of variations and modifications may be made by those skilled in the art without departing from the scope of this application, which are all within the scope of protection of this application.

Therefore, the protection scope of this application shall be subject to the appended claims.

The invention claimed is:

1. A child safety seat, comprising:

a base provided with a pivotable support leg;

a seat having a backrest, the backrest being provided with a height-adjustable headrest;

a headrest limiting device operably connected to the support leg, comprising:

a first locking member, wherein when the support leg is in an unfolded state, the first locking member is in an extended state, so that the first locking member is capable of being engaged with the headrest, thereby limiting an upper adjustment height of the headrest, and when the support leg is in a folded state, the first locking member is in a retracted state; or a second locking member, wherein when the support leg is in the unfolded state, the second locking member is in a retracted state, and when the support leg is in the folded state, the second locking member is in an extended state, so that the second locking member is capable of being engaged with the headrest, thereby limiting a lower adjustment height of the headrest.

2. The child safety seat of claim 1, wherein the headrest is disposed on an inner side of the backrest, an outer side of the backrest is provided with a blocking block connected to the headrest, and the blocking block is adapted to move up and down following the headrest, the blocking block comprises an upper limiting surface that is adapted to be engaged with the first locking member, or the blocking block comprises a lower limiting surface that is adapted to be engaged with the second locking member.

3. The child safety seat of claim 2, wherein the outer side of the backrest is provided with a track in sliding fit with the blocking block.

4. The child safety seat of claim 1, wherein the headrest limiting device further comprises:

a first locking assembly comprising:

a first elastic restoring member mounted on the backrest and connected to the first locking member;

a first pulling rope having a first end and a second end, the first end being connected to a first connection point of the support leg, and the second end being operably connected to the first elastic restoring member, when the support leg is in the unfolded state, the first elastic restoring member maintains the first locking member in the extended state, and when the support leg is in the folded state, the first elastic restoring member is subjected to a force from the first pulling rope and deformed, so that the first locking member is switched from the extended state to the retracted state, or a second locking assembly comprising:

a second elastic restoring member mounted on the backrest and connected to the second locking member;

a second pulling rope having a first end and a second end, the first end being connected to a second connection point of the support leg, and the second end being operably connected to the second elastic restoring member, when the support leg is in the folded state, the second elastic restoring member maintains the second locking member in the extended state, and when the support leg is in the unfolded state, the second elastic restoring member is subjected to a force from the second pulling rope and deformed, so that the second locking member is switched from the extended state to the retracted state.

5. The child safety seat of claim 4, wherein the first elastic restoring member is integrally formed with the first locking member, or the second elastic restoring member is integrally formed with the second locking member.

6. The child safety seat of claim 4, wherein the support leg is pivotally connected to the base by a pivot point, the first connection point is disposed on a top portion of the support leg, and the first connection point and the pivot point are spaced apart by a first preset distance in a length direction of the support leg, or the second connection point is disposed on the top portion of the support leg, and the second connection point and the pivot point are spaced apart by a second preset distance in the length direction of the support leg.

7. The child safety seat of claim 6, wherein a front end of the base is provided with a first guide portion through which the first pulling rope is engaged with the front end of the base, a length of the first pulling rope between the first guide portion and the first connection point when the support leg is in the unfolded state is smaller the length of the first pulling rope between the first guide portion and the first connection point when the support leg is in the folded state, or the front end of the base is provided with a second guide portion through which the second pulling rope is engaged with the front end of the base, a length of the second pulling rope between the second guide portion and the second connection point when the support leg is in the folded state is smaller the length of the second pulling rope between the second guide portion and the second connection point when the support leg is in the unfolded state.

8. The child safety seat of claim 4, wherein the seat is pivotally connected to the base through a hollow rotating shaft, the first pulling rope passes through the rotating shaft, or the second pulling rope passes through the rotating shaft.

9. The child safety seat of claim 4, wherein the seat is fixedly connected to the base, a bottom of the base is provided with a first guide structure or a second guide structure, the first pulling rope passes through the first guide structure, and the second pulling rope passes through the second guide structure.

10. The child safety seat of claim 4, wherein the first locking assembly further comprises a first mounting seat mounted on the backrest and having a first receiving groove, the first elastic restoring member is located in the first receiving groove, and a groove bottom of the first receiving groove is provided with a first through hole for the first locking member to be extended or retracted; or the second locking assembly further comprises a second mounting seat mounted on the backrest and having a second receiving groove, the second elastic restoring member is located in the second receiving groove, and a groove bottom of the second receiving groove is provided with a second through hole for the second locking member to be extended or retracted.

11. The child safety seat of claim 10, further comprising:

a first driving pin connected to the second end of the first pulling rope, and the first driving pin being received in the first receiving groove and being abutted against the first elastic restoring member; or a second driving pin connected to the second end of the second pulling rope, and the second driving pin being received in the second receiving groove and being abutted against the second elastic restoring member.

12. The child safety seat of claim 11, wherein a groove wall of the first receiving groove is provided with a first slideway, and the first driving pin is in sliding fit with the first slideway; or a groove wall of the second receiving groove is provided with a second slideway, and the second driving pin is in sliding fit with the second slideway.

13. The child safety seat of claim 11, wherein the first elastic restoring member is provided with a first opening, the second end of the first pulling rope is provided with a first connecting ring, and the first connecting ring is located in the first opening and sleeved on the first driving pin; or the second elastic restoring member is provided with a second opening, the second end of the second pulling rope is provided with a second connecting ring, and the second connecting ring is located in the second opening and sleeved on the second driving pin.

14. The child safety seat of claim 11, wherein a first end of the first elastic restoring member is connected to the first mounting seat, a second end of the first elastic restoring member is extended obliquely toward a groove bottom of the first mounting groove, and the first locking member is located on the second end of the first elastic restoring member; or a first end of the second elastic restoring member is connected to the second mounting seat, a second end of the second elastic restoring member is extended obliquely toward a groove bottom of the second mounting groove, and the second locking member is located on the second end of the second elastic restoring member.

15. The child safety seat of claim 1, further comprising:

a height adjustment mechanism disposed between the backrest and the headrest, the height adjustment mechanism allowing the headrest to have an upper limit adjustment height and a lower limit adjustment height on the backrest, wherein a height value of the upper limit adjustment height is greater than that of the upper adjustment height, or a height value of the lower limit adjustment height is less than that of the lower adjustment height.

16. The child safety seat of claim 15, wherein the headrest is provided with a shoulder belt hole and a seatbelt restrainer, and the lower limit adjustment height and the upper adjustment height correspond to a distance between a lower edge of the shoulder belt hole and an upper surface of a seat portion of the seat, or the upper limit adjustment height and the lower adjustment height correspond to a distance between a lower edge of the seatbelt restrainer and an upper surface of the seat portion of the seat.

* * * * *